United States Patent [19]

Knebel et al.

[11] Patent Number: 5,142,062

[45] Date of Patent: Aug. 25, 1992

[54] METHOD OF INCREASING THE MOLECULAR WEIGHT IN THE MANUFACTURE OF POLYSUCCINIMIDE

[75] Inventors: Joachim Knebel, Darmstadt; Klaus Lehmann, Rossdorf, both of Fed. Rep. of Germany

[73] Assignee: Rohm GmbH Chemische Fabrik, Darmstadt, Fed. Rep. of Germany

[21] Appl. No.: 726,337

[22] Filed: Jul. 5, 1991

[30] Foreign Application Priority Data

Jul. 24, 1990 [DE] Fed. Rep. of Germany ....... 4023463

[51] Int. Cl.⁵ ................ C07D 207/325; C07D 403/06
[52] U.S. Cl. .................... 548/545; 548/543; 548/546
[58] Field of Search ......................... 548/545

[56] References Cited

U.S. PATENT DOCUMENTS 3,352,860 11/1967 Hass et al. ........................ 548/545
3,452,002 6/1969 Brasch ............................. 548/545

FOREIGN PATENT DOCUMENTS 262665 12/1988 Fed. Rep. of Germany .
1181366 2/1970 United Kingdom ............... 548/545

*Primary Examiner*—David B. Springer
*Attorney, Agent, or Firm*—Oblon, Spivak, McClelland, Maier & Neustadt

[57] ABSTRACT

A method of manufacturing polysuccinimides with molecular weights in the range 100,000 to about 200,000 by polycondensation of aspartic acid, with phosphoric acids as condensation agents, in at least two process stages, at temperatures of 100°–250° C. and under reduced pressure, where in the second stage the mixture containing aspartic acid and phosphoric acid undergoes subsequent condensation following comminution.

14 Claims, No Drawings

METHOD OF INCREASING THE MOLECULAR WEIGHT IN THE MANUFACTURE OF POLYSUCCINIMIDE

BACKGROUND OF THE INVENTION

1. Field of the Invention:

The invention relates to the manufacture of polysuccinimide from aspartic acid. Polysuccinimide is obtained which has advantageously high molecular weight.

2. Discussion of the Background:

Polysuccinimide can be produced by cyclizing and polycondensing aspartic acid according to the following equation:

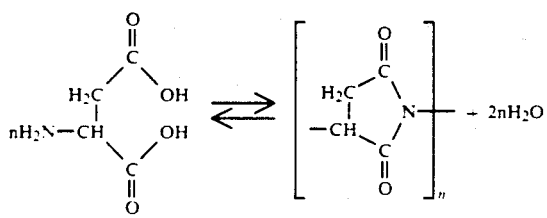

According to a method described by Neri, P., et al. 1973 J. Med. Chem., 16, 893, the polycondensation of aspartic acid is carried out by long heating at 180° C. under reduced pressure, in the presence of 85% phosphoric acid. The initially pasty mass hardens to compacted pieces or, in the case of a polycondensation carried out by a rotary method, it hardens to a thin, coherent solid film. The coherent, solid polycondensation mass is refined to yield polysuccinimide with a molecular weight of about 100,000±10,000 g/mol.

DD-PS 262.665 describes a method of manufacturing polyaspartimide (another systematic name for polysuccinimide, also known as polyanhydroaspartic acid). According to this patent, in a first step, aspartic acid is precondensed in the presence of polyphosphoric acid, under reduced pressure; and in a second step the polycondensate of molecular weight between 2,600 and 3,900, after removal of the polyphosphoric acid, is further condensed in the solid phase at 180° C. under vacuum. Depending on the duration of the subsequent condensation (4-12 hr), polyaspartimides (polysuccinimides) with molecular weights between 5,100 and 12,200 are obtained.

Polymer synthesis by polycondensation is always an equilibrium reaction, with a constantly decreasing reaction rate, and by the time the degree of polymerization reaches 1,000 the rate is practically zero ("Ullmann's Encyklopaedie der technischen Chemie", 4th Ed., Vol. 15, pp. 192-195). Results of this type were obtained in the work of Neri et al cited above.

The importance of polysuccinimide is particularly that it can be subjected to polymerization-type reactions to form other valuable polymers.

Thus, the α,β-poly(2-hydroxyethyl)-DL-aspartamide described by Neri et al may be used as a plasma expander, and the polyaspartic acid derivatives obtained with amines of the formula H—N(A)B according to Ger. Pat. App. P 39 21 912.7 may be used in pharmaceutical and food preparations, where these polymers must be film-forming.

In the derivatization of polysuccinimide, for example, to form polyaspartamides by reaction of the polysuccinimide with amines, chain cleavage occurs, so that the new polymers have lower degrees of polymerization than the polysuccinimide starting material. Polymers with good film properties, however, have relatively high molecular weights. Film-forming polyaspartamides have molecular weights of at least 20,000-30,000. Derivatization to form usable polymer products is easier if the initial molecular weight of the polysuccinimide is high.

SUMMARY OF THE INVENTION

One object of the present invention is to find conditions for polycondensation of aspartic acid to form polysuccinimide with a much higher molecular weight than the about 100,000±10,000 obtainable by known methods.

It has been discovered, in connection with the invention, that polysuccinimide of appreciably higher molecular weight (about 2×100,000) and purity may be obtained by carrying out the polymer condensation of aspartic acid in the presence of phosphoric acid or, advantageously, phosphoric anhydride ($P_2O_5$), or polyphosphoric acid, in two or more stages, under known temperature and pressure conditions, where as a novel feature, it is essential to mechanically comminute the compacted solid mixture of polysuccinimide and phosphoric acid and/or polyphosphoric acid, prior to the subsequent condensation in the second stage.

DETAILED DESCRIPTION OF THE PREFERRED EMBODIMENTS

The present invention is directed to a method of manufacturing polysuccinimides with molecular weights in the range 100,000 to about 200,000 by polycondensation of aspartic acid in the presence of condensation agents, at temperatures greater than about 100° C. and pressures less than 1 bar, in at least two process stages; characterized in that 1) the mixture of aspartic acid and phosphoric acid and/or phosphoric anhydride and/or polyphosphoric acid is polycondensed at 100° C.–250° C. and pressures <1 bar in a first stage, to form a compacted solid mixture containing polysuccinimides of molecular weights from about 10,000 to about 100,000; then 2) this compacted, hard reaction mixture is mechanically comminuted, followed by subsequent condensation of the comminuted mixture in a second stage, under the temperature and pressure conditions employed in the first stage.

The consistency of the comminuted mixture is pulverulent to fine granular, i.e. with particle sizes ≦ about 2 mm, i.e. about 0.001–2.0 mm. The reduced pressure during the condensation stages is preferably <0.1 bar, preferably <0.01 bar. The refinement of the reaction mixture to recover the high molecular weight polysuccinimide is by known methods, e.g. as described in Neri et al.

According to the present method, polysuccinimide with molecular weight ≧200,000 may be prepared directly from aspartic acid. Polysuccinimides with molecular weights this high can be prepared according to Neri et al only after reaction of polysuccinimides of molecular weights of about 100,000 with dicyclohexylcarbodiimide.

Although the process according to Neri et al is capable of producing polysuccinimides having molecular weights ranging up to and above about 200,000, the use of dicyclohexylcarbodiimide results in an impure polysuccinimide product. Further, the polysuccinimides prepared by the process of Neri et al contain the reaction product dicyclohexylurea. Both dicyclohexylcarbodiimide and dicyclohexylurea are poisonous and difficult to remove from the polysuccinimide product. These difficulties and drawbacks are removed by the process of the present invention which produces a substantially pure polysuccinimide.

The starting material may be D-, L-, or D,L-aspartic acid. The starting aspartic acid is mixed with the condensation agent (phosphoric acid, phosphoric anhydride, or polyphosphoric acid), in a ratio (by weight) of 1:0.1 to 1:2, preferably 1:0.3 to 1:1. The phosphoric acid is usually employed as the 85% acid, where preferably an intimate mixture of aspartic acid and phosphoric acid is prepared which has a pasty consistency. In the first stage of the formation of polysuccinimide, the mixture of aspartic acid and condensation agent is heated to temperatures of 100° C.-250° C., preferably 150° C.-220° C., particularly preferably 170° C.-220° C., under reduced pressure and where the water of reaction is withdrawn from the polycondensation reaction mixture to suppress the reverse reaction to form the monomer. The polycondensation is carried out at pressures <1.0 bar, preferably <0.1 bar, particularly <0.01 bar, most preferably (e.g.) in an oil pump vacuum, i.e. at pressures <0.001 bar.

With this step, one obtains compacted, large pieces comprising the reaction mixture, or when a rotating reactor is used one obtains compacted layers resting against the reactor wall. If one refines such a reaction mixture, isolating the polysuccinimide which it contains, the molecular weight, determined by viscometry in dimethylformamide (DMF) as solvent (Neri et al, p. 894) with the use of the viscosity/molecular weight relationship given by Neri et al, is about 90,000.

To prepare for subsequent condensation in a second stage (and possibly further stages thereafter), the compacted, hard reaction mixture must be comminuted, to obtain a comminuted product having the smallest possible particle size, i.e. the product should be a powder or have particle size at most about 2 mm. Mechanical methods (impact, friction, and grinding) are . used for the comminution, preferably by means of known equipment.

The fine particle mixture comprising the thus prepared initial polysuccinimide condensate of molecular weight in the range from about 20,000 to 100,000 and the condensation agent is then subjected to a second stage of condensation under the known temperature and pressure conditions employed in the first stage. In each of the two stages the duration of the polycondensation is in the range 1–10 hr, preferably 1–4 hr.

Known methods are employed to refine the resulting polycondensation mixture to isolate the polysuccinimides, e.g. acid-free washing with water, or dissolution in a solvent (e.g. DMF) and precipitation of the polymer with water, followed by acid-free washing.

In this way, one obtains polysuccinimides with molecular weights unambiguously above 100,000 and ranging up to and above about 200,000.

Comparison tests such as are presented in the experimental part below show that subsequent condensation techniques such as those set forth in DD-PS 262,665 can only provide a relatively small increase in molecular weight for a given reaction time.

Other features of the invention will become apparent in the course of the following descriptions of exemplary embodiments which are given for illustration of the invention and are not intended to be limiting thereof.

EXAMPLES

Preparation of polysuccinimide according to P. Neri et al

Example 1

50 g (0.38 mol) L-aspartic acid were mixed with 25 g (0.22 mol) 85% phosphoric acid and charged to the rotation flask (1 L) of a rotary evaporator. A vacuum was produced (pressure <10 mbar) and the rotation flask was immersed in an oil bath preheated to 200° C. Condensation was carried out for 4 hr at this temperature, at 180 rpm. Then the mixture was allowed to cool, and 25 g reaction mixture was sampled and washed with cold acid-free water. The sample was dried 8 hr at 70° C.-80° C. and 1 mbar. The molecular weight of the resulting light yellow polysuccinimide was 86,000 g/mol as determined by the viscometric (in DMF) method of Neri et al. Additional 25 g samples of the reaction mixture were retained for the subsequent condensation.

Subsequent condensation of polysuccinimide

Example 2

25 g phosphoric-acid-containing raw product from Example 1 was comminuted to a particle size of 0.001–2.0 mm and was subjected to subsequent condensation for 4 hr in a drying oven at 200° C. and 1 mbar. After each hour, a sample was taken, washed with acid-free water as in the above Example 1, dried, and subjected to molecular weight determination. The following molecular weights were obtained (by viscometry in DMF):

| Reaction time | Molecular weight (g/mol) |
| --- | --- |
| 1 hr | 129,000 |
| 2 hr | 125,000 |
| 3 hr | 124,000 |
| 4 hr | 124,000 |

Comparison Example A

Subsequent condensation according to DDPS 262,664

15 g acid-free polysuccinimide from Example 1 (according to Neri et al) was pulverized to a particle size of 0.001–2.0 mm and subjected to subsequent condensation for 4 hr at 200° C. and 1 mbar in a drying oven. After each hour, a sample was taken and was subjected to molecular weight determination. The following molecular weights were obtained (by viscometry in DMF):

| Reaction time | Molecular weight (g/mol) |
| --- | --- |
| 1 hr | 91,000 |
| 2 hr | 91,000 |
| 3 hr | 99,000 |
| 4 hr | 97,000 |

Example 3

L-aspartic acid was polycondensed to form polysuccinimide as in Example 1, but the reaction was interrupted after ½ hr at 180° C. The raw product was still fluid while hot, and was easy to remove from the reaction vessel. A sample of this polysuccinimide after washing in acid-free medium had a molecular weight of 12,000 g/mol (determined viscometrically). 25 g raw product was comminuted and was subjected to subsequent condensation for 4 hr at 170° C.-180° C. and 1 mbar, in a drying chamber. The product was allowed to cool, was washed with cold acid-free water, was dried, and was subjected to molecular weight determination by viscometry. The molecular weight was 111,000 g/mol.

Example 4

The subsequent condensation was carried out as in Example 2, but after 1 hr at 200° C. and 1 mbar the product (molecular weight=130,000) was removed from the drying chamber, pulverized in an impact pulverizer, and subsequently condensed 3 hr at 180° C. and 1 mbar. After water washing and drying, the polysuccinimide had a molecular weight of 210,000 g/mol (determined by viscometry).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of manufacturing polysuccinimide, comprising the steps of:
    1) polycondensing a mixture of aspartic acid and a condensing agent selected from the group consisting of phosphoric acid, phosphoric anhydride, polyphosphoric acid, and mixtures thereof at 100° C.-250° C. and pressures less than 1 bar in a first stage, to form a solid mixture containing polysuccinimide; and
    2) mechanically comminuting said solid mixture, followed by subsequent condensation of the comminuted mixture in a second stage, under the temperature and pressure conditions employed in said first stage.

2. The method of claim 1, wherein said comminuted mixture has a particle size in the range 0.001-2 mm.

3. The method of claim 1, wherein the ratio by weight of the aspartic acid to the condensing agent is in the range 1:0.1 to 1:2.

4. The method of claim 1, wherein the ratio by weight of the aspartic acid to the condensing agent is in the range 1 0.3 to 1:1.

5. The method of claim 1, wherein the polycondensing steps in said first stage and said second stage are carried out in the temperature range of 150° C.-220° C.

6. The method of claim 1, wherein the polycondensing steps in said first stage and said second stage are carried out in the temperature range of 170° C.-220° C.

7. The method of claim 1, wherein the polycondensing steps in said first stage and said second stage are carried out at pressures less than 0.1 bar.

8. The method of claim 1, wherein the polycondensing steps of said first stage and said second stage are carried out at pressures less than 0.01 bar.

9. The method of claim 1, wherein the polycondensing steps in said first stage and said second stage are carried out at pressures less than 0.001 bar.

10. The method of claim 1, wherein said solid mixture contains polysuccinimide having a molecular weight of from about 10,000 to about 100,000.

11. The method of claim 1, wherein polysuccinimide obtained after said second stage has a molecular weight in the range 100,000 to about 200,000.

12. The method of claim 1, wherein said solid mixture contains said condensing agent.

13. A substantially pure polysuccinimide having a molecular weight in the range of about 100,000 to about 200,000.

14. The polysuccinimide of claim 13, wherein said polysuccinimide contains no dicyclohexylcarbodiimide or dicyclohexylurea.

* * * * *